2 Sheets--Sheet 1

S. INGERSOLL.

Rock-Drill.

No 6,293.

Reissued Feb. 16, 1875.

*Witnesses:*

R. Smith

Henry C. Sergeant

*Inventor:*

Simon Ingersoll

2 Sheets--Sheet 2.

S. INGERSOLL.

Rock-Drill.

No. 6,293.

Reissued Feb. 16, 1875.

*Witnesses:*

R. Smith

Henry B. Sergeant

*Inventor:*

Simon Ingersoll

UNITED STATES PATENT OFFICE.

SIMON INGERSOLL, OF BROOKLYN, ASSIGNOR, BY MESNE ASSIGNMENTS, TO THE INGERSOLL ROCK-DRILL COMPANY, OF NEW YORK CITY.

IMPROVEMENT IN ROCK-DRILLS.

Specification forming part of Letters Patent No. 115,478, dated May 30, 1871; reissue No 6,293, dated February 16, 1875; application filed February 3, 1875.

*To all whom it may concern:*

Be it known that I, SIMON INGERSOLL, of the city of Brooklyn, county of Kings and State of New York, have invented a new and useful Improvement in Machines for Drilling Rock; and that the following, taken in connection with the drawings, is a full, clear, and exact description thereof.

These improvements have for their object to reduce the size of the drill, to make it compact, and to render it less liable to breakage.

The drill to which these improvements relate is of that variety in which the drilling-tool is connected with a piston, and reciprocates as the piston does. This variety of drill is an old one, and the valves have been moved for years by a cam located outside of the cylinder and connected with the piston-rod. In some cases this cam was so secured to the rod, that the rod, and, consequently, the drilling-tool, could turn without turning the cam. In others the cam was a spindle, and revolved with the tool and piston-rod, different parts of its surface acting at each successive stroke upon the tappets which moved the valves. By this latter contrivance one joint was dispensed with, and, as these machines are subject to great jar and concussion of the parts, the latter plan was an improvement upon the former one.

In both plans the piston and tool could move after the valve or valves were shifted, the tappets being so contrived that the cam could pass by them, so that the piston was not stopped in its course by the cam bringing up against the tappets. These two plans have been worked out under a great variety of forms of tappets, and of varieties of valves.

In order to render the machine as a whole more compact, and still further to simplify it, I conceived the idea of projecting the tappet through the metal of the cylinder into its cavity, so that their faces, which are acted upon, are sometimes within the cavity or bore of the cylinder, and of moving these tappets by a prolongation of the piston, or what is substantially the same thing, by the ends of the piston itself.

It is in a drill comprising this feature, in combination with other features hereinafter specified, that my invention is embraced.

Figure 1:
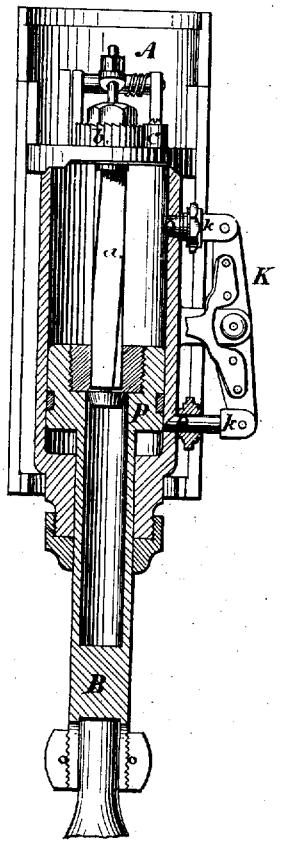
Figure 2:
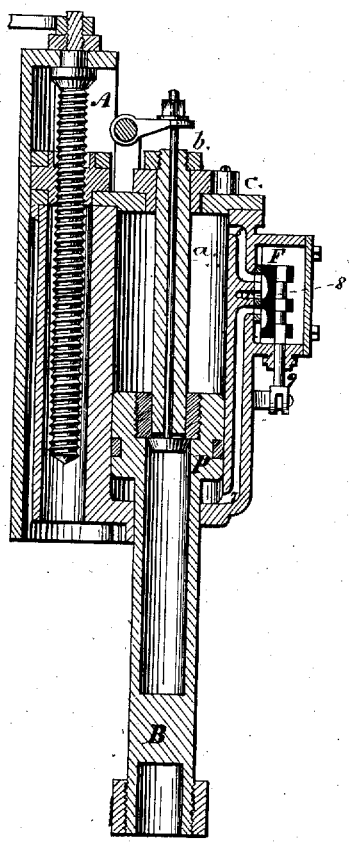
Figure 3:
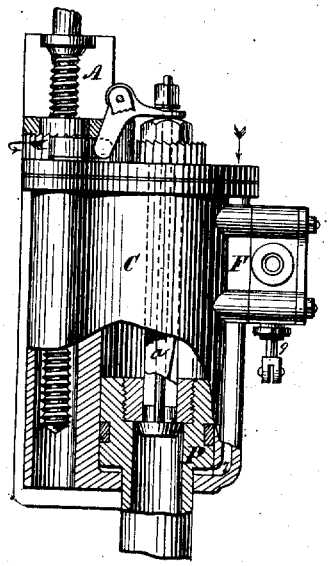
Figure 4:
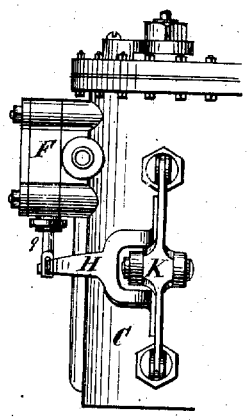

In the drawings, Figure 1 is a section in the line of the axis of the drill-cylinder. Fig. 2 is a similar section, taken at right angles to the former. Fig. 3 is a view, partly in elevation, and partly in section; and Fig. 4 is a plan, showing the tappet-lever, valve-stem, and chest, &c.

In these drawings, the frame supporting the cylinder is shown at A, the cylinder itself at C, the piston at P, the piston-rod at B, the tappets at *k k*, with inclined acting faces at Q Q, the tappet-lever (which is a rocking-lever) at K, and at H an arm attached thereto, and, in fact, making part thereof. The valve-chest is shown at F, the valve-stem at *g*, the exhaust-passage at 8, and the passages leading to the two ends of the cylinder at 6 and 7. The valve shown in the drawings is of the B or double-cupped variety.

The operation of these parts is as follows: The piston as it approaches either end of the stroke, strikes one of the tappets and shifts the valve, thus admitting steam against that end of the piston which is then approaching either cylinder-head, and opening the exhaust so as to relieve the pressure upon the other end of the piston.

Inspection of the drawings will show that the tappets enter at times into the cavity or bore of the cylinder, and are actuated by a cam or bumper, which is the two ends of the piston.

Inspection and consideration of the drawings will further show that the piston can continue its movement after it has shifted the valve, that its movement is not arrested by the tappets, and that it can revolve with the drilling-tool and yet act upon the tappets as efficiently as if it did not turn in its containing-cylinder, this being essential in a drill in which, from the necessities of the case, the length of stroke constantly varies, and in which the force of the blow is due partly to the pressure of the steam or air, and partly to the momentum of the parts.

With the cylinder and piston I combine a mechanism for rotating the latter. One form of such mechanism is represented in the drawing, consisting of a spiral bar, *a*, attached to the upper head of the cylinder, and working in a corresponding female spiral in the piston. The spiral bar is attached to a ratchet, *b*, which is free to revolve with the spiral bar on the downstroke of the piston; but is, with the spiral bar, held fast by the pawl *c* on the upstroke of the piston, which causes the piston during this stroke to have a rotary movement.

By organizing the drill in the manner described I attain important advantages. I shorten the drill, render it more compact, and reduce its weight, whereby the operator is enabled to get the machine in positions for mining where a longer and heavier drill could not be operated practically.

In rock-drills, the piston is liable to strike against and knock out the head of the cylinder. This can occur in my machine without derangement of or injury to the valve or rotating mechanisms, which, in machines of this class hitherto employed, has not been the case.

In conclusion, I would state that I do not claim, broadly, a valve motion, in which valve-actuating tappets, projecting into the interior of a steam-cylinder, are operated by the piston to produce the movements of the valve; but Having described my improvements, what I claim, and desire to secure by Letters Patent, is—

In organized machinery for drilling rock, &c., the combination, with the steam-cylinder, steam-valve, and valve-operating tappets projecting laterally into the interior of the cylinder, of the steam-piston, arranged to operate said tappets, and to continue its stroke without being restrained by the same, the drill-carrying rod fixed to said piston and working through one head of the cylinder, and mechanism arranged to rotate said piston and drill-carrying rod within the cylinder, substantially as shown and set forth.

Witness my hand.

SIMON INGERSOLL.

Witnesses:

P. SMITH,

HENRY C. SERGEANT.